(12) United States Patent
Motsanos et al.

(10) Patent No.: US 8,871,854 B2
(45) Date of Patent: Oct. 28, 2014

(54) RECYCLABLE COMPOSITE AND A METHOD AND A KIT FOR PRODUCING IT

(75) Inventors: Giottis Motsanos, Norrkoping (SE); Mats Dalborg, Aby (SE)

(73) Assignee: Trifilon AB, Stockholm (SE)

( * ) Notice: Subject to any disclaimer, the term of this patent is extended or adjusted under 35 U.S.C. 154(b) by 782 days.

(21) Appl. No.: 12/677,440

(22) PCT Filed: Sep. 10, 2008

(86) PCT No.: PCT/SE2008/051010
§ 371 (c)(1),
(2), (4) Date: Apr. 5, 2010

(87) PCT Pub. No.: WO2009/035403
PCT Pub. Date: Mar. 19, 2009

(65) Prior Publication Data
US 2010/0324208 A1    Dec. 23, 2010

(30) Foreign Application Priority Data

Sep. 11, 2007   (SE) ...................................... 0702015

(51) Int. Cl.
*B29C 70/20*   (2006.01)
*C08J 5/04*    (2006.01)
(Continued)

(52) U.S. Cl.
CPC .............. *B29C 70/20* (2013.01); *B29K 2083/00* (2013.01); *C08J 5/047* (2013.01); *B29K 2707/04* (2013.01); *B29K 2049/00* (2013.01); *B29K 2069/00* (2013.01); *C08J 5/24* (2013.01); *B29K 2025/00* (2013.01); *B29K 2079/00* (2013.01); *B29C 70/342* (2013.01); *B29K 2281/00* (2013.01); *B29K 2311/10* (2013.01); *B29K 2055/00* (2013.01); *B29K 2081/00* (2013.01); *C08J 2363/00* (2013.01); *B29K 2063/00* (2013.01); *B29K 2105/0041* (2013.01)
USPC ......................................................... 524/495

(58) Field of Classification Search
CPC ...... B29C 70/00; B29C 70/08; B29C 70/023; C08J 5/047; C08J 5/24
USPC ......................................... 524/495, 496, 612
See application file for complete search history.

(56) References Cited

U.S. PATENT DOCUMENTS 8,080,288 B2 * 12/2011 Van Raemdonck ........... 427/392
2002/0121720 A1 9/2002 Davies et al.
(Continued)

FOREIGN PATENT DOCUMENTS

CN          2337175 Y     9/1999
JP          07033904 A  * 2/1995 ............... C08J 11/12
(Continued)

OTHER PUBLICATIONS

Japanese Abstract of JP 07-033904A (Feb. 3, 1995).*
(Continued)

*Primary Examiner* — Ling Choi
*Assistant Examiner* — Lanee Reuther
(74) *Attorney, Agent, or Firm* — Maier & Maier, PLLC

(57) ABSTRACT

The present invention relates to a recyclable composite having natural (4) and carbon fibers (6) as a reinforcement material and epoxy resin (8) as a matrix. Preferably, the natural fibers are hemp. Furthermore, the present invention relates to a method for producing such a recyclable composite comprising the steps of preparing the composite, vacuum bagging it and then heating it with a heating cable (12). Finally, the present invention relates to a kit having a frame (10), a heating cable (12) and an apparatus box with a thermostat and heat sensors and which can be used for performing the method according to the invention.

14 Claims, 3 Drawing Sheets

(51) Int. Cl.
*C08J 5/24* (2006.01)
*B29C 70/34* (2006.01)
*B29K 83/00* (2006.01)
*B29K 707/04* (2006.01)
*B29K 69/00* (2006.01)
*B29K 25/00* (2006.01)
*B29K 79/00* (2006.01)
*B29K 281/00* (2006.01)
*B29K 311/10* (2006.01)
*B29K 55/00* (2006.01)
*B29K 81/00* (2006.01)
*B29K 63/00* (2006.01)
*B29K 105/00* (2006.01)

(56) References Cited

U.S. PATENT DOCUMENTS

2004/0235376 A1 11/2004 Byma et al.
2007/0160479 A1 7/2007 Livingston et al.

FOREIGN PATENT DOCUMENTS

WO   2007/025782 A1   3/2007
WO   WO 2007025782 A1 *   3/2007   ............... B05D 3/02

OTHER PUBLICATIONS

International Search Report dated Jan. 19, 2009 to corresponding international patent application No. PCT/SE2008/051010, filed Sep. 10, 2008, 3 pages.

Chinese Office Action dated Feb. 4, 2013, as issued in corresponding Chinese Patent Application No. 200880106608.5 (with English Translation—12 pgs.).

* cited by examiner

RECYCLABLE COMPOSITE AND A METHOD AND A KIT FOR PRODUCING IT

RELATED APPLICATIONS

This application claims priority, under 35 U.S.C. §119, to international patent application No.: PCT/SE2008/051010, filed on Sep. 10, 2008, which claims priority to Swedish patent application No.: 0702015-9, filed Sep. 11, 2007, the disclosures of which are incorporated by reference herein in their entireties.

TECHNICAL FIELD OF THE INVENTION

The present invention relates to a recyclable composite having natural and carbon fibres as a reinforcement material. Furthermore, the present invention also relates to a method for producing such a recyclable composite. Finally, the present invention relates to a kit usable for performing the method according to the invention.

DESCRIPTION OF RELATED ART

The benefits of composite materials are well documented. The great variety of applications from sporting equipments to high performance aerospace components has made them very popular. The advantages with composites are that they have low weight, great strength and high stiffness.

The use of carbon fibres as a reinforcement material in composites has been known for a long time. Usually a matrix or binding material of thermoplastics or epoxy resins is used to bind the fibres together. There are different ways to produce composites. If the binder material is a thermoplastic, high temperatures and high pressures are needed to produce the composite. It is therefore necessary to use complex and very expensive moulds, which also are limited in size. Single moulds require a higher pressure than is available through vacuum and will therefore need to be heated in an autoclave. Therefore it is preferred to use double-sided press moulds. This method will give a high throughput, but costs for making the tools are high.

Another method to produce composites is by wet lamination. In this method layer by layer of for example carbon fibres are laid one at a time and a matrix of epoxy resin is rolled on to each layer of carbon fibres before next layer of carbon fibre is laid. The first layer of fibres is usually laid in a tool or in a half mould in order to give the composite its desired shape. When all layers are completed the whole package is vacuum bagged and put into an oven or an autoclave in order for the composite to cure.

It is also known to use so-called "prepregs" when producing a composite. A prepreg is a fibre that has been preimpregnated with the matrix, for example epoxy resin, before it is used to laminate. This is a much cleaner process, since the prepreg is already semi-cured. In comparison to wet lamination, this means that one can omit the step of rolling wet epoxy resin on the fibres. The layers are laid against a tool or mould, vacuum bagged and then heated in an oven or in an autoclave to cure the composite.

The most common carbon fibre based composite used today is carbon fibres together with thermoplastic or epoxy resin. As mentioned above the thermoplastic filler is preferred for mass production. When it comes to more complicated structures it is preferred to use epoxy resin as the filler. Using epoxy resin will also make it possible to achieve higher fibre content, by volume, in the final product, i.e. about 70% instead of about 30-50%, which is common when a thermoplastic is used. The higher fibre content will of course also make the final product much stronger. Instead of carbon fibres, fibres such as glass fibres, aramid fibres, polyester fibres, boron fibres etc can be used.

It is also known to use natural fibres. This is an interesting approach in light of the ongoing discussion about the environmental load. Examples of natural fibres are jute, hemp, sisal, flax and the like. In order to fabricate a composite body the natural fibres are mixed with fibres of a thermoplastic synthetic material or the natural fibres are impregnated directly with a thermoplastic bonding agent and preformed into fibre mats. The fibre mats can then be formed into the desired shape by pressing in a die at a moulding temperature of the synthetic material being used. A problem with using natural fibres is the low thermal stability of natural fibres, i.e. that they cannot be heated above 250° C. or they can be damaged. For that reason bonding agents having a low-melting temperature are used, such as polypropylene, polyethylene, ethylene vinyl acetate etc.

U.S. Pat. No. 7,067,443 describes a multilayer composite body including thermoplastic layers and layers of thermoplastic synthetic materials, for the fabrication of components, especially for motor vehicles. The basic concept of this invention is the use of a reinforcing insert together with natural fibres in order to improve the strength characteristics of the final product. The reinforcing insert may be polyester fibres, glass fibres or carbon fibres.

U.S. 2004/0235376 describes a structural reinforcement layer for use in a laminate for a vehicle headliner. The headliner comprises at least one of carbon fibres and natural fibres and a thermoplastic binder is used to adhere the fibres to each other. This invention further describes a laminate material including carbon fibres that have a melting point and/or a degradation point above the incineration point of the other composite materials. This will make the carbon fibre contained in the composite recyclable. The laminate is heated to a temperature below the melting and/or degradation point of the carbon fibres and above the incineration point of the other composite materials to reduce the other composite materials to ash and leave the carbon fibres for further use. It is true that the carbon fibres are recycled but in order to do so a relative high amount of energy is required.

The methods used in the above cited art use press moulding in order to produce the composite material. In conjunction with the present invention this is not the preferred method, since the present invention is directed towards producing complicated shapes in low series and objects with large surface areas. Even if it would be possible to produce very complex shapes and objects with large surface areas with press moulding it would be extremely expensive to manufacture such tools.

GB 2 322 823 describes a method for producing a membrane to be used in a vacuum bagging system. Furthermore, it describes how to use the vacuum bagging system for producing a composite material. Vacuum bagging is a method for producing pressure on a composite while the resin is curing and consolidation takes place. The vacuum bag is formed from a pair of rubber membranes sandwiching a heater mat there between. Electrical connections are provided on the heater mat, which can be plugged into a 240/110 volt supply. When producing the composite it is laid in a half mould and the vacuum bag is placed over it with its edges sealed to the mould. Vacuum is created in the bag and voltage is applied to the heating mat to heat the composite to its curing temperature. The great benefit with this method is that curing can take place anywhere, i.e. one is not tied to the use of the oven or autoclave. However, the drawback is that the size of the vacuum bag must be adapted to size of the composite to be produced. This makes it necessary to manufacture the vacuum bag with an integrated heating mat in a lot of different sizes.

U.S. Pat. No. 4,267,147 discloses a method for producing large structural components such as boats and swimming pools of fibre reinforced synthetic materials. An air impermeable foil is sealed over the layers of pre-impregnated fibre material. Then the air under the foil is evacuated in order to create pressure and press the layers against the mould. To cure the synthetic materials large heated mats, similar to electric blankets, are used. Usually the heated mats do not cover the whole object and they have to be moved around in order to cure the complete object. It is also suggested to use several heating mats to overcome the problem. Despite this, the method has problems at the boundaries between areas cured at different times, which may not be cured if not great care is taken. If several heating mats are used and they are overlapping it can affect the useful life of the heating mats.

U.S. Pat. No. 6,355,203 shows a method for reconstituting or reconstructing a composite object having a defect where the heat source for curing the matrix used to mend the defect is a radiant source, the emission of which includes infrared radiation. This heat source is only to be used to cure small spots on a composite object.

Thus, it would be great if there would be a heat source for curing composites that is flexible and adaptable to the individual form of the composite without having the problem of overlapping areas or having to tailor make the heat source for the specific composite to be produced.

It would also be desirable to produce a composite that is recyclable without having to use a lot of energy to recycle it.

SUMMARY OF THE INVENTION

Accordingly it is an object of the present invention to provide a recyclable composite in which the carbon fibres are easy to recycle and which process does not need a lot of energy to get started.

This object is solved with a composite having reinforcement materials comprising of natural and carbon fibres and in which the fibres are embedded in a matrix of epoxy resin, if possible, in the future based on renewable resources.

In a preferred embodiment the composite comprises unidirectional carbon fibres and the natural fibres are hemp. There are a number of benefits to use hemp as a natural fibre. Hemp has a high-energy content, high strength and a low density. The composite is suitable for both pure laminates as well as for sandwich panels i.e. honeycomb or other core materials, moulded in one step.

A further object of the present invention is to provide a method for producing a recyclable composite without the use of an oven or an autoclave. This is solved by a method using a heating cable that is wound around the composite object to be cured. The use of a heating cable has the advantage that one long enough heating cable can be used for almost any size and geometry of object provided that the excess cable is taken care of in a suitable way.

Furthermore it is an object of the present invention to provide a kit usable for performing the method according to the present invention. This is solved by providing a kit comprising a heating cable and a specially developed frame adapted to take care of the excess cable in organized way.

DESCRIPTION OF THE DRAWINGS

The present invention and its many objects and advantages will become clearer upon reading the following description of the preferred embodiments in conjunction with the following drawings, wherein.

DESCRIPTION OF PREFERRED EMBODIMENTS

Figure 1:
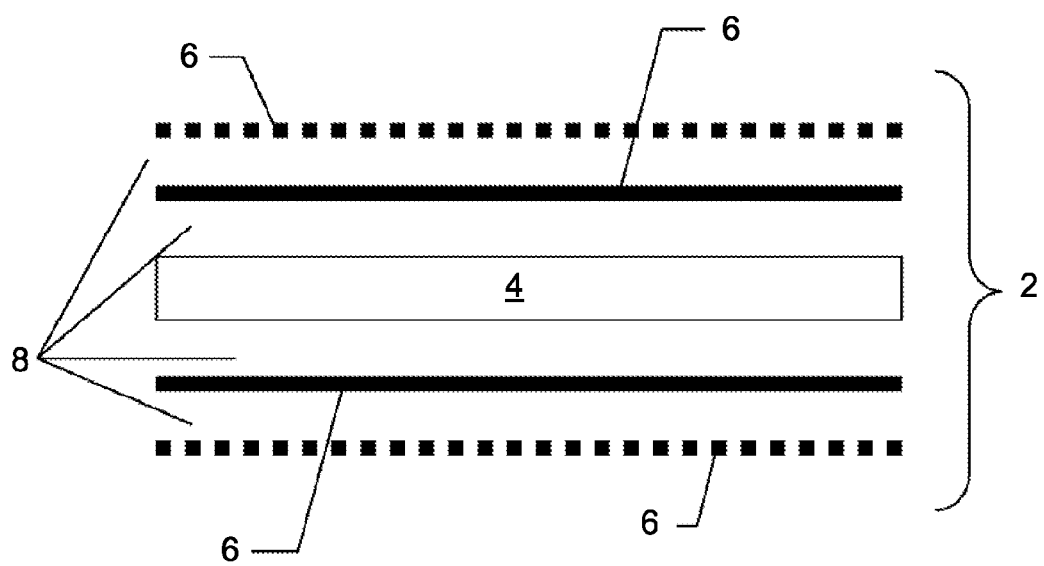
FIG. 1 shows an example of a recyclable composite according to the present invention.

Turning now to the drawings, where like reference numerals identify identical or corresponding elements, and particularly FIG. 1 thereof, an example of a recyclable composite 2 is shown. In its basic form the composite 2 comprises a core 4 of natural fibres, such as jute, hemp, sisal, flax and the like. In a preferred embodiment hemp is used as the natural fibre. There are several environmental benefits if hemp is used as a core. Firstly, hemp can be grown in many different climates, which makes it possible to collect hemp locally and thereby reduce the environmental load caused by transportation. Secondly, hemp is the only plant that removes vermin from the soil and thus there is no need to use pesticides when growing hemp. Thirdly, hemp has a high-energy content, which is useful when recycling the composite according to the present invention.

Another advantage with hemp is that it has a low density, a relatively high strength and high capability to absorb energy. These properties in combination with the extremely high strength and stiffness of carbon fibres 6 will give a very good composite useful in many different applications.

Thus, in the preferred embodiment the core 4 is made of hemp, preferably of a hemp prepreg. If the hemp prepreg is used or not does theoretically not affect the quality and performance of the final composite object, but gives advantages when performing the method according to the present invention, as will be described in detail below. However, in practice there is a difference between using prepreg hemp and dry hemp. When using dry hemp it will be almost impossible to produce the final composite with an exactly predetermined amount of matrix. Thus, when using dry hemp it will be very difficult to determine the properties of the final composite. Thus, by using hemp prepreg instead of dry hemp it is possible to affect the final quality of the product, since the amount of matrix used is readily controllable.

On both sides of the core 4 of hemp are at least one layer of carbon fibres 6 provided. Two layers 6 are shown in FIG. 1. It should be noted that the orientation of the carbon fibres 6, shown in FIG. 1, differ 90° between the first layer closest to the core 4 and the second outer layer. The purpose of the carbon fibres 6 is to reinforce the hemp and thus the orientation, the number of layers and placement of the carbon fibres 6 can be made in a variety of different ways depending on the properties wanted in the final product, as is well known by a person skilled in the art. Also the carbon fibres 6 may be dry carbon, dry recyclable or prepregged (preimpregnated) carbon fibres or any combination thereof and are preferably unidirectional, which enhances the recycling properties of the final composite 2 and also the final strength of the composite.

To bind the natural fibres and the carbon fibres together a matrix of epoxy resin 8 is used. Epoxy resin renders the hemp fibres an excellent hydrophobic protection, which is superior to what is possible when using thermoplastics and resin plastics. Also the carbon fibres 6 show very low water absorption. Thus, providing the carbon fibres 6 around a core 4 of hemp gives an excellent vapour barrier. The use of epoxy resin 8 makes it also possible to come close to the optimal limit for the maximum fibre volume. The use of epoxy resin 8 will give a fibre volume of about 70%, compared to a fibre volume of 30-50%, which is attainable when thermoplastics and resin plastics are used as matrix or filler material. This will of course have a positive affect on the strength of the composite and is also friendlier to the environment, since the amount of non-renewable material in the final composite is reduced.

It should be noted that the term epoxy resin should be interpreted broadly. Even if epoxy resins of today are based on common petrochemical oil it is envisaged that it may be produced by any renewable or biological material in the future and thus the term epoxy resin should be interpreted in that sense.

As mentioned above unidirectional carbon fibres are easier to recycle then woven carbon fibre. The combination of carbon fibre and hemp will facilitate that the carbon fibres are released easily when incineration occurs. The incineration of the composite is very easy to start and can be compared with the incineration of candles (wick effect). The hemp will function as fuel and the carbon fibre as wick. As mentioned a minimal amount of energy is required to start the process that releases the internally stored energy of the composite. Thus, the composite will give back energy when it is incinerated instead of requiring energy as is common for an ordinary carbon fibre/epoxy composite. The released energy could be taken care for in a district heating plant or the like.

To further enhance the recyclability of the composite ribbons or layers of natural fibres, such as hemp are provided between each layer of unidirectional carbon fibres. It should be understood that also thin cloth ribbons or non-woven mats of synthetic fibres may be used to separate different carbon fibre layers in order to make it more recyclable.

Now a method for producing a composite material will be described. As mentioned above the method according to the present invention is most beneficial in conjunction with the production of composite materials that have complex geometries. The method could in short be described as an electro-heated vacuum bagging technology. Vacuum bagging as described above is a commonly used technology for producing composites and is well known by a person skilled in the art and is therefore not described in detail. When the composite has been prepared and vacuum bagged it will need heat in order to cure. Usually an oven or an autoclave is used for that purpose. This is however very energy consuming. According to the present invention a heating cable 12 is used as the heat source. The heating cable 12 can be connected directly to the mains, i.e. a 240/110 voltage supply. Thus, using a heating cable 12 will make the producing of composites much more flexible since the composite can be produced anywhere where there is a power supply. The use of ovens and autoclaves is much more stationary.

The important thing, when using a heating cable 12, is that the heat generation of the cable is controllable. The heating cable 12 is wound around the object to be heated with a predefined distance between each winding and may be fastened with tape, preferably aluminium tape. The distance between each winding is determined by the capacity of the heating cable 12 and the amount of heating needed to cure the composite. Preferably a distance of 50 mm is used to optimize the heating effect, but shorter distances will of course give more heat and longer distances will give lesser heat to the object being cured. In order to reduce the energy consumption the heating cable 12 is covered with a layer of an isolation foil to keep the heat in the composite being produced. The length of the heating cable may be 50 meters or any other suitable length. In a preferred embodiment of the invention heating cables 12 can be connected in series in order to increase the length thereof.

Figure 2:
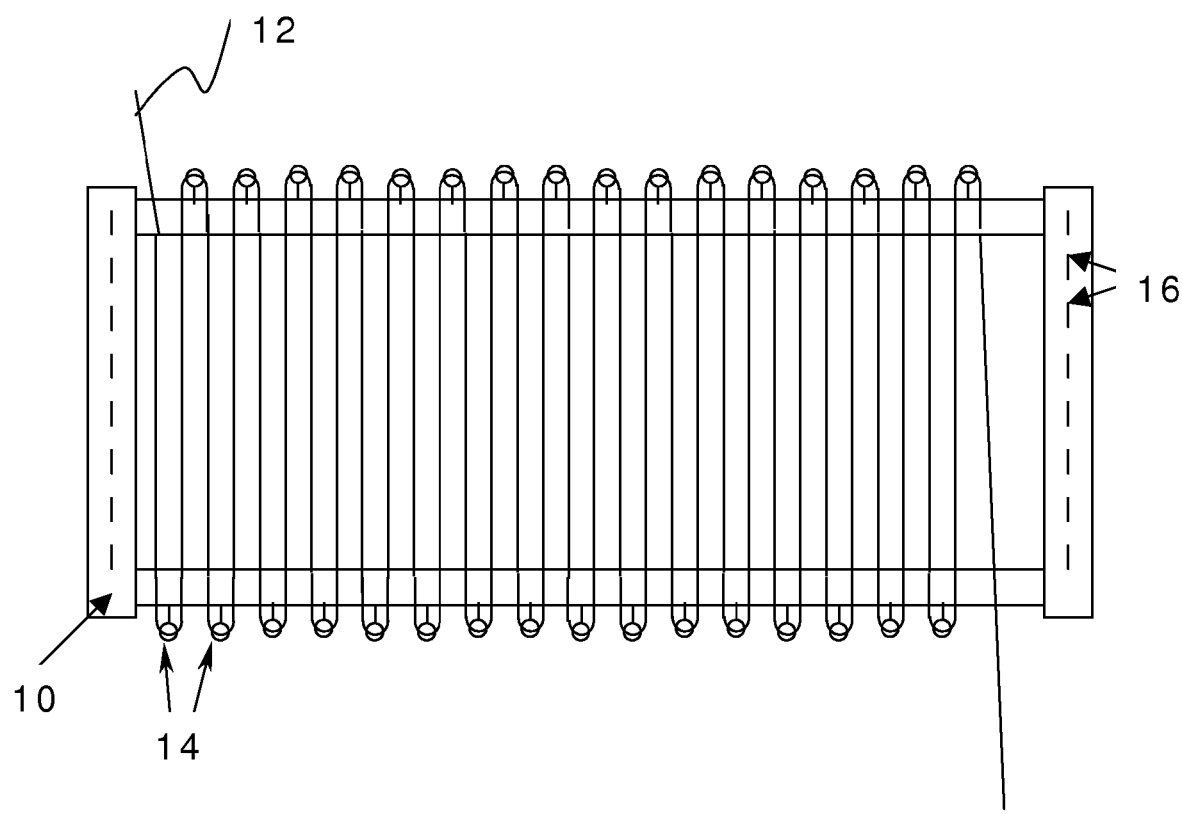
FIG. 2 shows a frame for winding excess heating cable.
Figure 3:
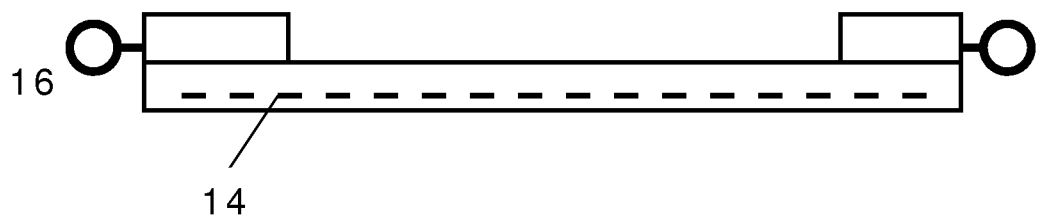
FIG. 3 shows a side view of the frame depicted in FIG. 2.

When using the heating cable 12 it is important that the cable does not cross over itself or abuts itself, because this will substantially reduce the useful life of the heating cable 12. Excess of the heating cable 12 may therefore according to a preferred embodiment of the present invention be stored on a specially designed frame 10, which is shown in FIGS. 2 and 3. FIGS. 2 and 3 shows the frame 10, the heating cable 12 wound around loops or eyes 14. The frame 10 comprises two longitudinally legs and two vertically legs and is made of wood or another heat resistant material. The frame 10 is provided with loops or eyes 14, screws or nails, hereinafter winding support means, by which the excess heating cable 12 is guided such that it is wound up around the frame 10. On the frame 10 that is shown in FIG. 2, it is possible to wind the heating cable 12 in two layers, of which only one is used in the figure. The first layer, which is shown in the FIG. 2, is wound around the winding support means 14 provided on the longitudinally legs of the frame 10. The second layer, not shown, may be wound around the winding support means 16, provided on the vertically legs of the frame 10. There are different ways to arrange and provide the winding support means 14, 16 on the legs of the frame 10. For example, FIG. 3 shows eyes 16 that are provided on the side of the vertical legs of the frame 10 and FIG. 2 shows the eyes 16 provided on the top of the vertical legs. The distance between the winding support means may be around 50 mm, but may also be any other distance depending on heat capacity of the heating cable 12. Greater capacity will of course require greater distance or the heating cable 12 might get damaged.

It might seem odd to call a frame of wood for heat resistant, but it should be understood that the method for laminating the preferred composite according to the invention usually uses a temperature of about 100-150° C. to cure the laminate. The temperature depends on the type of epoxy resin system that is used as matrix. It is possible to use temperatures up to 220° C. according to the present invention. Thus, in that aspect wood is to be seen as heat resistant. Of course other materials could be used for the frame, the important thing being that they are heat resistant and non-conductive.

In order to perform the method according to the present invention a useful kit has been provided. The kit comprises of the heating cable 12, which preferably is grounded, and an apparatus box having a thermostat and heat sensors. Thus, the heating cable 12 is ready to be used without any involvement from the user. Furthermore, the kit comprises the above described frame for taking care of excess heating cable, if applicable.

In a further embodiment of the invention the kit also comprises all the components, which are necessary for performing the vacuum bagging step according to the method of the present invention. Such components may be different releasing, aluminium and isolation foils, sealing compounds, aluminium tape and digital thermometers. It may also include corrugated cardboard or the like on which the frame and the excess heating cable can be put in order to protect the floor or table on which it is laid. Other components incorporated in the kit might be material for forming tools, a vacuum pump, hoses etc.

Although the present invention has been described with reference to a preferred embodiments it should be understood that other embodiments and variations are likewise possible within the scope of the invention, which is best defined by the accompanying claims.

The invention claimed is:

1. A recyclable composite having reinforcement materials comprising natural and carbon fibres embedded in a matrix of epoxy resin, wherein the natural fibres are used as a core in the composite, which core is surrounded on both sides by several layers of carbon fibres wherein the carbon fibre layers on each side of the core are separated by inserts, separate from the core, between at least two of the carbon fibre layers on a respective same side of the core, the inserts being of natural fibres.

2. A recyclable composite according to claim 1, wherein the carbon fibres are unidirectional.

3. A recyclable composite according to claim 1, wherein the core is hemp prepreg.

4. A recyclable composite according to claim 1, wherein the carbon fibres are pre-impregnated carbon fibres.

5. A recyclable composite according to claim 1, wherein the carbon fibres are recycled carbon fibres.

6. A recyclable composite according to claim 1, wherein the carbon fibres are selected from the group consisting of dry carbon fibres, new carbon fibres, recycled carbon fibres and pre-impregnated carbon fibres.

7. A method for producing a recyclable composite according to claim 1, comprising the steps of:
   preparing the composite layer by layer,
   vacuum bagging the prepared composite,
   winding a heating cable around the vacuum bagged composite,
   winding, if appropriate, the excess heating cable around a frame,
   connecting the heating cable to a power supply.

8. A method according to claim 7, further comprising the step of covering the vacuum bagged composite and the heating cable with an isolation foil.

9. A method according to claim 7, in which the step of preparing the composite comprises the step of impregnating the natural fibres with epoxy resin.

10. A method according to claim 7, in which the step of preparing the composite comprises the step of impregnating the carbon fibres with epoxy resin.

11. A kit for performing the method as defined in claim 7, comprising a frame, heating cable and an apparatus box having a thermostat and heat sensors.

12. A kit according to claim 11 further comprising vacuum bagging components.

13. A recyclable composite according to claim 1, wherein the inserts are hemp.

14. A recyclable composite according to claim 1, wherein the carbon fibres comprise at least one of dry carbon fibres, new carbon fibres, recycled carbon fibres and pre-impregnated carbon fibres.

* * * * *